Sept. 29, 1970 R. L. EBY 3,531,654

SOLID STATE SUBSTITUTE FOR A DUAL TRIODE ELECTRON TUBE

Filed March 6, 1967

INVENTOR.
ROBERT L. EBY

BY

ATTORNEYS

United States Patent Office 3,531,654
Patented Sept. 29, 1970

3,531,654

SOLID STATE SUBSTITUTE FOR A DUAL TRIODE ELECTRON TUBE

Robert L. Eby, 1325 E. Altadena Drive, Altadena, Calif. 91001

Filed Mar. 6, 1967, Ser. No. 620,804
Int. Cl. G10h *5/04;* H02h *7/20*
U.S. Cl. 307—202 3 Claims

ABSTRACT OF THE DISCLOSURE

A plug-in solid state unit including transistors, diodes, and resistors mounted on a base inside an envelope adapted to be inserted into a mounting socket for a conventional glass dual triode electron tube of an electronic organ oscillator as a replacement therefor.

This invention pertains to electronic organs, and more particularly to a plug-in structure which may without other operation than mere insertion into an electron-tube socket, effectively replace and functionally serve in lieu of a removed electron tube, with marked advantages and additionally to an improved multiple tone generator rich in harmonics for use in generating a desired signal for an electric organ and utilizing only solid state components.

Conventional electronic organs employ as tone generating elements a large number of electronic oscillators each comprising an oscillatory circuit comprising a capacitive device, an inductive device and an active device in the form of an electron tube. For example, such an oscillatory circuit may be arranged as a Hartley oscillator, or as a Colpitts oscillator, both well known configurations in the radio communications art. When employed in electronic organs, such electronic oscillators are customarily arranged on a chassis. Associated with the oscillators are electrical resistors. In this manner there are disposed on the chassis a large number of electrical components which in operation generate heat. The filaments of the electron tubes especially as well as the resistors necessarily generate large amounts of heat, which must be dissipated. In some instances the electron tube envelopes house a pair of triodes to the end that a single filament serves to activate both triodes in the interest of economy and less heating load. Nevertheless, since the chassis space required for such a dual-triode tube is the same as for a single triode, the heat generated by the tube filaments per square foot of chassis area is approximately the same. That fact, and the fact that use of dual-triode tubes does not decrease the number of heat generating resistors, leaves heat dissipation as a serious problem for the designer of electronic organs, particularly when operated for prolonged periods as they not infrequently are.

Since the advent of solid-state electronic amplifiers such as transistors, tone generating oscillators for organs have been designed using such amplifiers, with resultant economy in power consumption and reduction of the problem of heat dissipation. However, that in no way benefits the owner of an electronic organ of the type using electron tubes. It is therefore a primary purpose of the present invention to provide a structure or device which can replace such an electron tube in the tube socket in existing organs, without adversely affecting the operation or musical characteristics of the organ or need for rearrangement of the components or any effort other than removal of a tube and insertion of the substitute device.

Among other advantages of the invention is the fact that the owners of older types of electronic organs no longer need search for replacement tubes. The present invention, providing an inexpensive readily-available substitute for the electron tube, allows gradual easy replacement of electron tubes as they become defective, with a concurrent advantage of reduction of power consumed and heat generated. Those results the invention accomplishes by providing, in a device arranged to plug into the tube socket or receptacle, an electronic means which utilizes the same terminal connections and operation potentials required for operation of the replaced electron tube. The device may be and preferably is of the same external shape, size and configuration as the electron tube it replaces.

The electrical or electronic means or components of the device, while functionally adapted to take the place of the electronic components of the vacuum tube triode without altering the organ circuitry beyond the tube socket, are quite different from the tube components.

The preceding brief introduction to the invention makes it evident that it is a principal object of the invention to provide a device which can be used as a direct mechanical and electrical replacement for the electron tube in a tone generating oscillator of an electronic organ.

Another object of the invention is to provide a device which can be used as a mechanical and electrical replacement for an electron tube in a tone generating oscillator of an electronic organ, with a resultant saving in both power consumption and undesired heat generation.

Another object of the invention is to provide an improved multiple tone generator for electronic organs formed entirely of solid state components and functioning to generate signals rich in harmonics.

These and other more specific objects will appear upon reading the following specification and claims and upon considering in connection therewith the attached drawing to which they relate.

Referring now to the drawing in which a preferred embodiment of the invention is illustrated:

Figure 1:
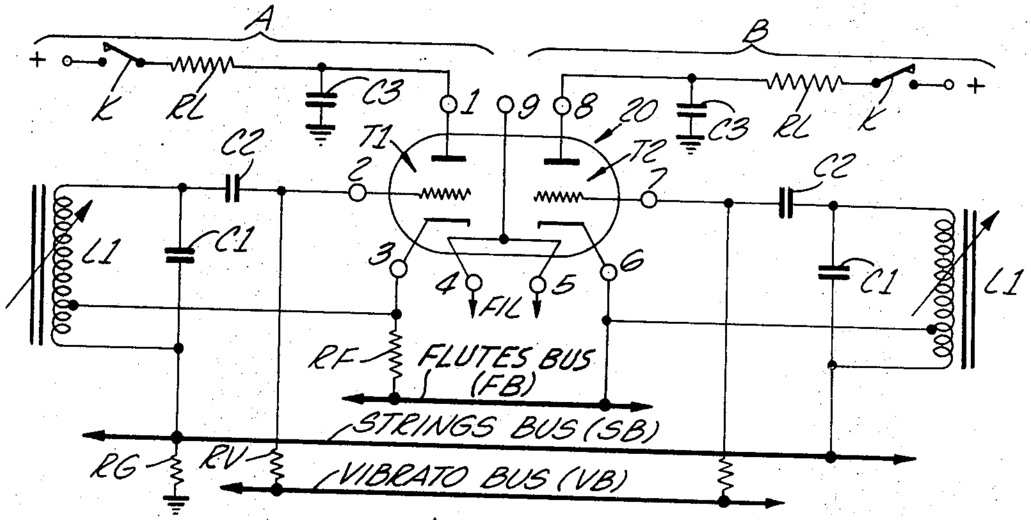
FIG. 1 is a schematic of portions of the electronic circuitry comprised in the tone-signal generating means of an electronic organ.

Referring first to FIG. 1, there is shown in schematic form the circuitry of an exemplary pair of similar tone signal generators A and B. Hence the description will be largely restricted to generator A which comprises an oscillatory circuit having a capacitor C1 and a variable inductive device L1 capacitively coupled via capacitor C2 to the grid of a triode section T1 of an electron tube 20. A tap connection from inductive device L1 to the cathode of triode T1 is made as shown. The anode of T1 is connected via load resistor RL and playing key switch K to the positive terminal of a grounded power source. A bypass capacitor C3 is connected between anode and ground as indicated; and the oscillatory (L1–C1) circuit is connected to a strings tone signal bus SB connected to ground via a resistor RG. A vibrato signal bus VB is connected via a resistor RV to the grid of triode section T1 as indicated; and a flute tone bus FB is connected via a resistor RF to the cathode of T1 as shown.

Filament power is supplied to the heater terminals 4 and 5 of tube 20 via means indicated F1L, and terminals 1, 2 and 3 of the tube are internally connected to the anode, grid, and cathode of triode T1. The circuitry described in the preceding paragraph is or may be conventional in electronic organs, and is effective when supplied electric power and keyed by switch K to produce tone signals on bus FB and bus SB and to be influenced by a vibrato signal applied to bus VB, all in a manner known in the prior art.

The other terminals 6, 7, 8 and 9 of tube 20 are connected as shown to the cathode, grid, anode, and heater, respectively, of the second triode T2 enclosed by a common envelope. Thus the tube provides the two active elements of the tone signal generators A and B and is of a suitable commercial type, such as 12AU7, adapted to be mounted in any suitable mounting socket.

Figure 2:
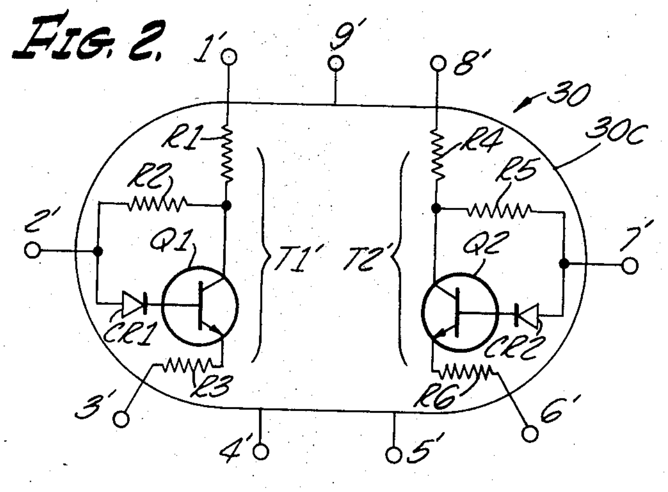
FIG. 2 is a schematic of electronic circuit components having the terminals thereof arranged similarly to the terminals of the electron tube in FIG. 1.
Figure 3:
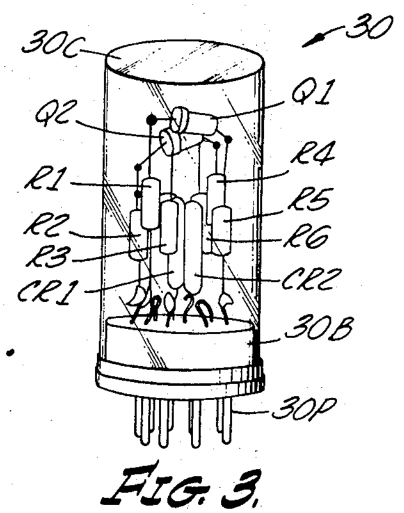
FIG. 3 is a perspective view of a complete device according to the invention.

The invention device 30 has a configuration illustrated in FIG. 3 and is substantially similar in appearance to the mentioned 12AU7 tube. Device 30 has an insulated base 30B, pin terminals 30P mounted thereon and a cap 30C. Housed within this cap are electronic circuit components Q1, Q2, R1, R2, R3, R4, R5, R6, CR1 and CR2 connected in circuit and to the terminal pins as illustrated in FIG. 2. While the interior of cap 30C may be filled with potting compound, preferably and as shown for illustrative purposes, the cap is not so filled, but is affixed and sealed to base 30B around the zone of contact of those parts.

The terminals provided by pins 30P are designated 1', 2', 3', 4', 5', 6', 7', 8', and 9', following the numbering arrangement used for the corresponding terminals of electron tube 20 distinguished therefrom by a prime. The circuitry comprised in the housing is divided into two sets, T1' and T2', set T1' being an effective functional replacement for triode T1 of tube 20 and set T2' being an effective functional replacement for triode T2 of tube 20. Thus, with the electrical connections as indicated, device 30 is in all respects the mechanical, electrical and functional equivalent of tube 20 in an electronic organ.

Figure 4:
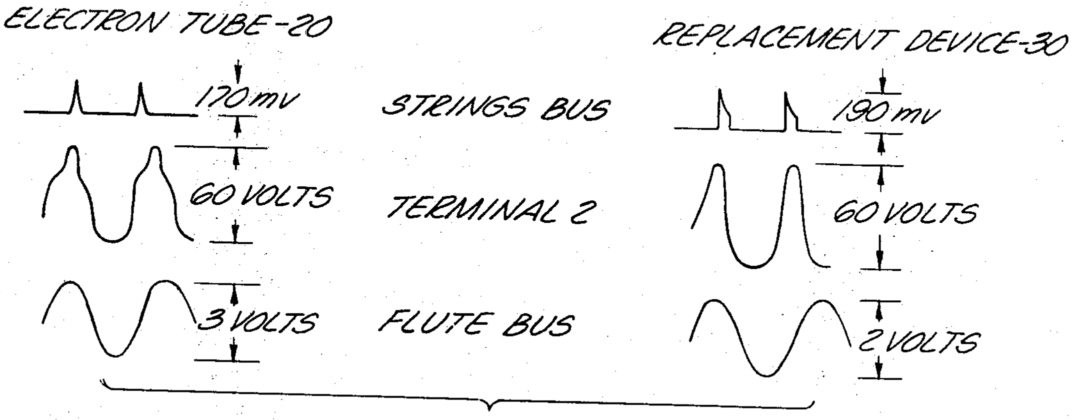
FIG. 4 shows a series of wave forms useful in explaining the invention.

Referring to the two sets of components and connections indicated in FIG. 2, and largely restricting the description to set T1' since the two sets are substantially identical, component Q1 is a transistor whose collector is connected via a resistor R1 to terminal 1' and whose emitter is connected via resistor R3 to terminal 3'. The base of Q1 is connected to a diode CR1 which is connected to terminal 2', and the latter terminal is also connected, via resistor R2, to the collector terminal of transistor Q1. The components Q1, CR1, R1, R2 and R3 and their interconnections are selected and arranged so that the substitute circuitry thus provided will in all respects function as a replacement for triode T1 in the exemplary circuitry of FIG. 1. Thus, with values and characteristics as hereinafter tabulated, the substitute circuitry will cause the tone signal generator to operate, in all practical respects as it did prior to replacement of electron tube 20. A comparison of significant electrical wave forms of signals produced in the tone signal generator circuitry with tube 20 operative, with the corresponding wave forms of signals produced with device 30 replacing the tube, is made in FIG. 4. Therein the wave forms of the signals produced on the strings tones signal bus and the flute tones signal bus are shown, and also that of the potential signal apparent at terminal 2. The effective similarity and nearly-identical characteristics are plainly evident. It is also thought apparent that the power consumption will be greatly reduced.

It should be noted that the device does not constitute nor involve mere substitution of a transistor for a triode electron tube for that cannot be done successfully as is evidenced by the disparity of potentials that must be applied to terminals of these two different devices. Nor could a transistor be simply mechanically plugged into the receptacle or socket from which a defective electron tube had been removed. Rather, the device is, mechanically and electrically, or functionally an effective and advantageous substitute or replacement for an electron tube. Exemplary values or identifying characteristics of the circuit components are set out in Table I.

TABLE I

| | |
|---|---|
| L1 | 70 to 0.35 henrys |
| C1 | 0.47 to 0.001 mfd. |
| C2 | 0.068 to 0.00033 mfd. |
| C3 | 0.47 to 0.10 mfd. |
| RF | 1 megohm to 250K ohms |
| RL | 100K to 33K ohms |
| RV | 1 megohm |
| RG | 10 to 100 ohms |
| Q1 | 2N3393 |
| CR1 | 1N4009 |
| R1 | 2.7K; ½ watt |
| R2 | 1 megohm; ½ watt |
| R3 | 820 ohms; ½ watt |

As will be evident from examination of the oscillatory circuit voltage swing, means providing a high reverse breakdown voltage between the emitter and base of the transistor must be provided, diode CR1 being present for that purpose. Resistors R1, R2 and R3 are necessary to establish potentials and currents compatible to both the existing retained circuitry of the tone-signal generator and the transistor.

The preceding description of a preferred examplary embodiment of the invention indicates full attainment of all of the noted objectives. As is evident changes within the spirit and scope of the invention will occur to those skilled in the art, and hence it is desired that the invention be not restricted to exact details of the exemplary embodiment disclosed, except as may be required by the appended claims.

I claim:

1. A unitary device for use in the electronic organ of the type having tone-signal generating means including a pair of electronic oscillators comprising as active elements respective electron tube triodes and which triodes comprise electron-tube base means having at least duplicate sets of first, second and third terminal pins arranged in a predetermined configuration, said unitary device comprising:

base means having duplicate sets of first, second and third terminal pins affixed thereto and arranged in the said predetermined configuration;

a dual set of electronic circuit components in said cavity mounted on said base means including conductive means interconnecting said components and said terminal pins, each set of said components comprising resistors, a diode and a transistor having a collector, a base and an emitter, said connecting means and each set of said components being electrically arranged and so connected to said pins as to function substantially the same as an electron tube triode in the tone-signal generating means of an electronic organ, with said transistor collector connected via a first of said resistors to a first one of said terminal pins and via a second one of said resistors to a second one of said terminal pins, and with said transistor base connected via said diode to said second one of said terminal pins, and with said transistor emitter connected via a third one of said resistors to a third one of said terminal pins, and said unitary device being effective to serve mechanically and functionally in an electronic organ in place of said respective electron tube triodes with a reduction of undesirable heat.

2. A device according to claim 1 characterized in that said device includes a second set of electronic circuit components and electrical connecting means therefor and said base comprising a second set of terminal pins, said second set of electronic circuit components being connected to respective terminal pins and interconnected in the same manner as those of said first named set, whereby said device is arranged for use in such electronic organ as a substitute for a dual-triode electron tube.

3. A device adapted to effectively function as a substitute for a dual triode electron tube in a set of electronic organ tone-signal generators, said device comprising:
an insulative base having terminal pins arranged in conformity with the terminal pin arrangement on a dual triode electron tube;
a hollow cap affixed on said base and forming therewith a housing providing an interior chamber;
first and second sets of electronic circuit components and conductive interconnections therefor, housed in said chamber and connected to selected ones of said terminal pins, each of said sets comprising a transistor having an emitter, a base and a collector, a diode, and first, second and third resistors, said collectors connected to respective ones of said pins via a respective first resistor and connected to a respective other one of said pins via a second resistor, said bases connected via a respective one of said diodes to a respective one of said other of said pins, and said emitters connected via respective third ones of said resistors to respective others of said pins not connected to said bases or said emitters;
each of said sets of electronic components effectively capable of serving as a substitute for an electron tube triode in a set of two electronic organ tone-signal generators.

References Cited

UNITED STATES PATENTS

| | | | |
|---|---|---|---|
| 2,527,552 | 10/1950 | Hough et al. | 313—197 |
| 3,193,707 | 7/1965 | Yanai | 307—202 |
| 3,241,044 | 3/1966 | Mills | 307—305 X |
| 3,270,252 | 8/1966 | Iversen | 317—101 |
| 3,371,227 | 2/1968 | Sylvan | 317—101 X |

WARREN E. RAY, Primary Examiner

U.S. Cl. X.R.

84—1.01; 313—1, 3, 318; 315—52; 317—101